(12) United States Patent
Wang et al.

(10) Patent No.: US 7,772,141 B2
(45) Date of Patent: Aug. 10, 2010

(54) COATINGS FOR AIRBAG FABRICS, COATED AIRBAG FABRICS, AND METHODS FOR MAKING THE SAME

(75) Inventors: Yunzhang Wang, Duncan, SC (US); Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 429 days.

(21) Appl. No.: 11/563,922

(22) Filed: Nov. 28, 2006

(65) Prior Publication Data

US 2007/0149072 A1 Jun. 28, 2007

Related U.S. Application Data

(60) Provisional application No. 60/742,230, filed on Dec. 5, 2005.

(51) Int. Cl.
*B32B 27/02* (2006.01)
(52) U.S. Cl. ..................................................... 442/164
(58) Field of Classification Search ................ 442/164, 442/182, 203, 286; 280/748.1, 729
See application file for complete search history.

(56) References Cited

U.S. PATENT DOCUMENTS

| | | | |
|---|---|---|---|
| 4,728,679 A | 3/1988 | Lark | |
| 4,997,862 A | 3/1991 | Lark | |
| 5,494,747 A | 2/1996 | Rha | |
| 5,776,839 A | 7/1998 | Dischler et al. | |
| 6,592,858 B1 | 7/2003 | Honda et al. | 424/76.1 |
| 6,770,578 B2 * | 8/2004 | Veiga | 442/164 |
| 2002/0106957 A1 | 8/2002 | Ritter | |
| 2004/0033341 A1 | 2/2004 | Lam et al. | |
| 2005/0266748 A1 | 12/2005 | Wagner et al. | |
| 2006/0217016 A1 * | 9/2006 | Lin et al. | 442/59 |

FOREIGN PATENT DOCUMENTS

| | | |
|---|---|---|
| EP | 0 712 956 A1 | 5/1996 |
| EP | 0 953 675 A2 | 11/1999 |
| EP | 0 972 789 A1 | 1/2000 |
| EP | 1 046 671 A2 | 10/2000 |
| EP | 1 205 595 A2 | 5/2002 |
| EP | 1 342 755 A2 | 9/2003 |
| EP | 1 681 326 A1 | 7/2006 |
| WO | WO 01/98115 | 12/2001 |
| WO | WO 2004/070102 A2 | 8/2004 |
| WO | WO 2005/066412 | 7/2005 |

* cited by examiner

*Primary Examiner*—Arti Singh-Pandey
(74) *Attorney, Agent, or Firm*—Cheryl J. Brickey

(57) ABSTRACT

An airbag fabric has a finish on a surface thereof, the finish comprising a plurality of particles having a diameter of about 20 μm or less. A process for producing a coated airbag fabric comprises the steps of (a) providing an airbag fabric, (b) contacting at least one surface of the airbag fabric with a coating composition comprising a plurality of particles having a diameter of about 20 μm or less, and (c) drying the fabric treated in step (b) to produce a finish on the airbag fabric.

17 Claims, 3 Drawing Sheets

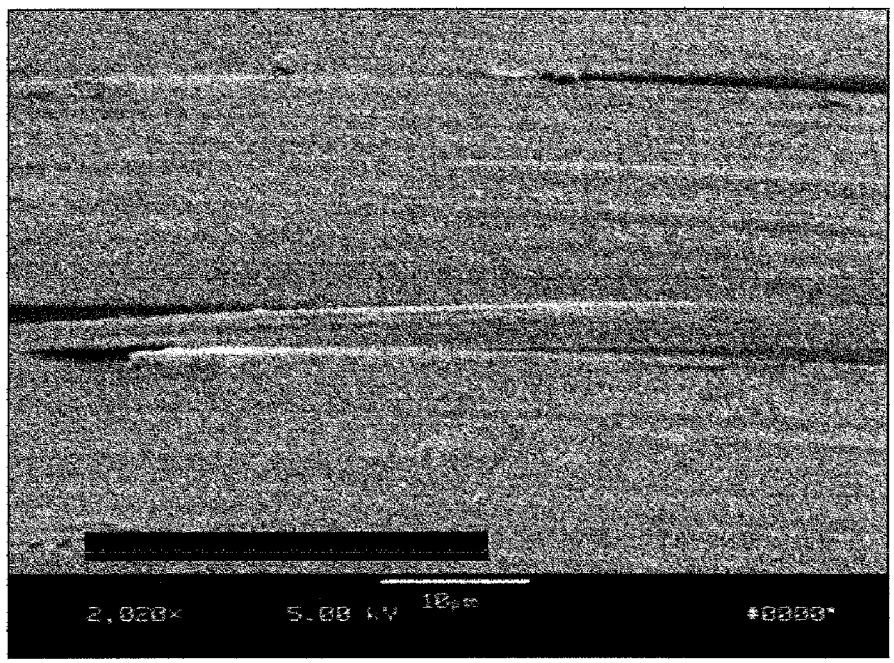
*FIG. -1-*
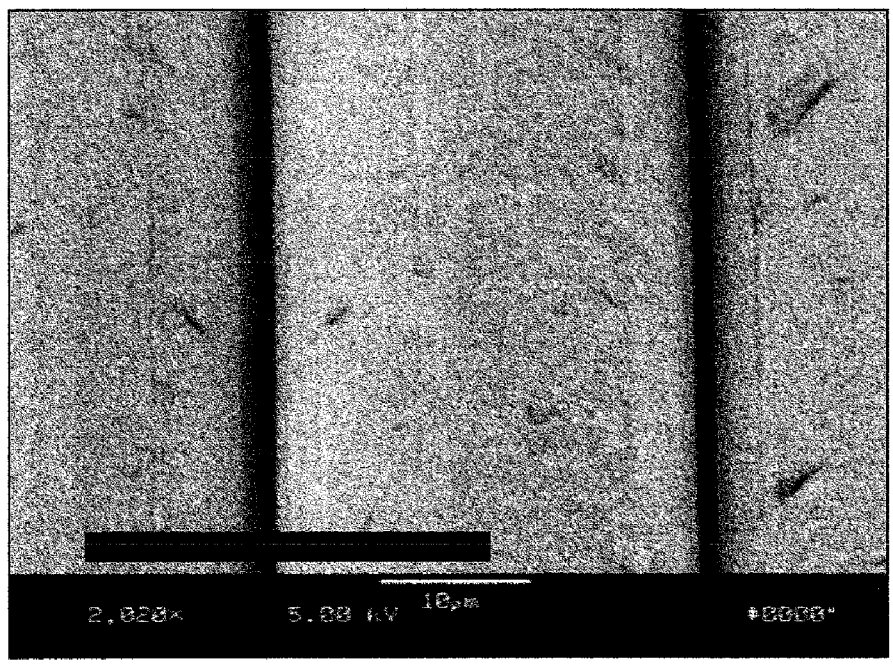
*FIG. -1A-*

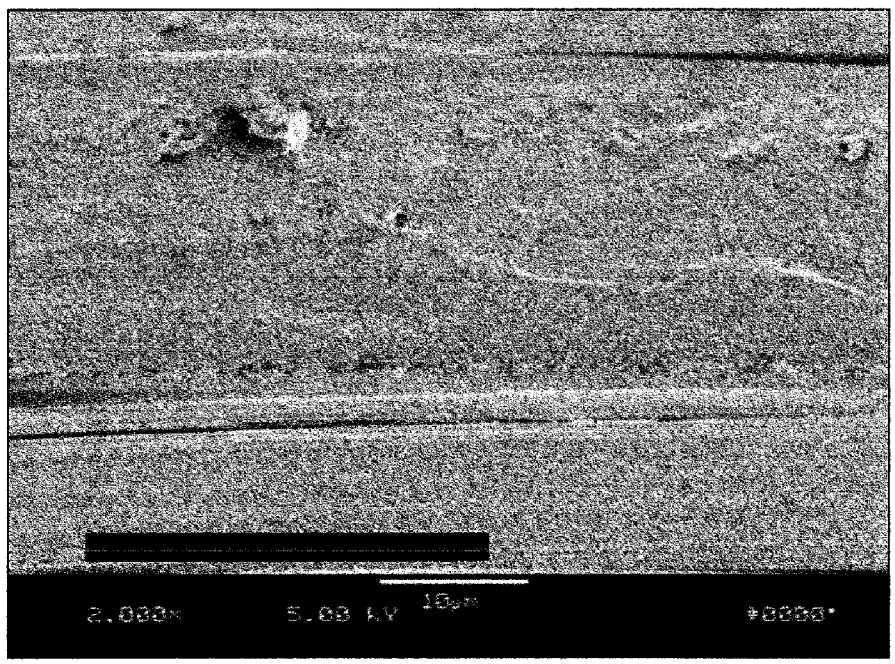
FIG. -2-
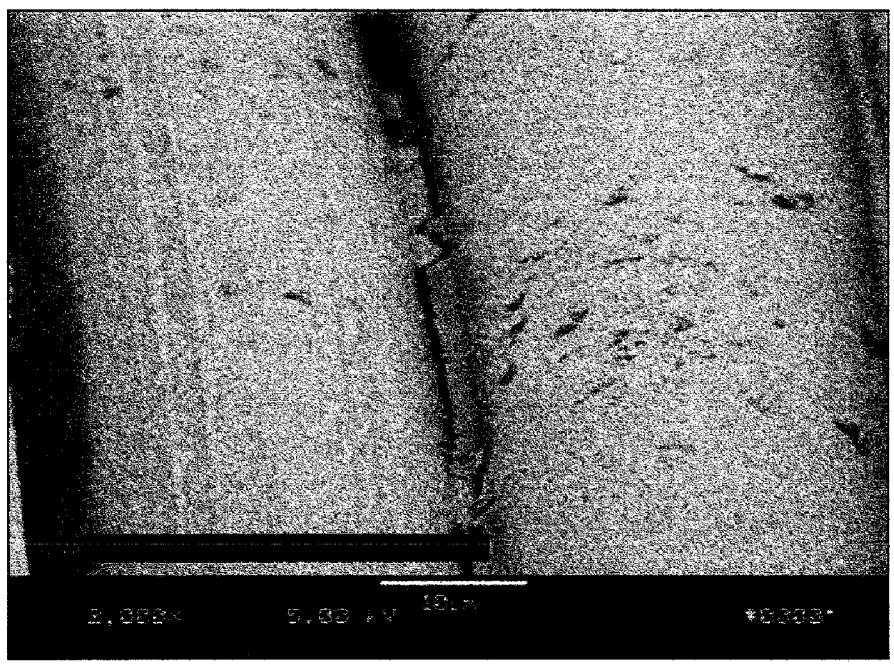
FIG. -2A-

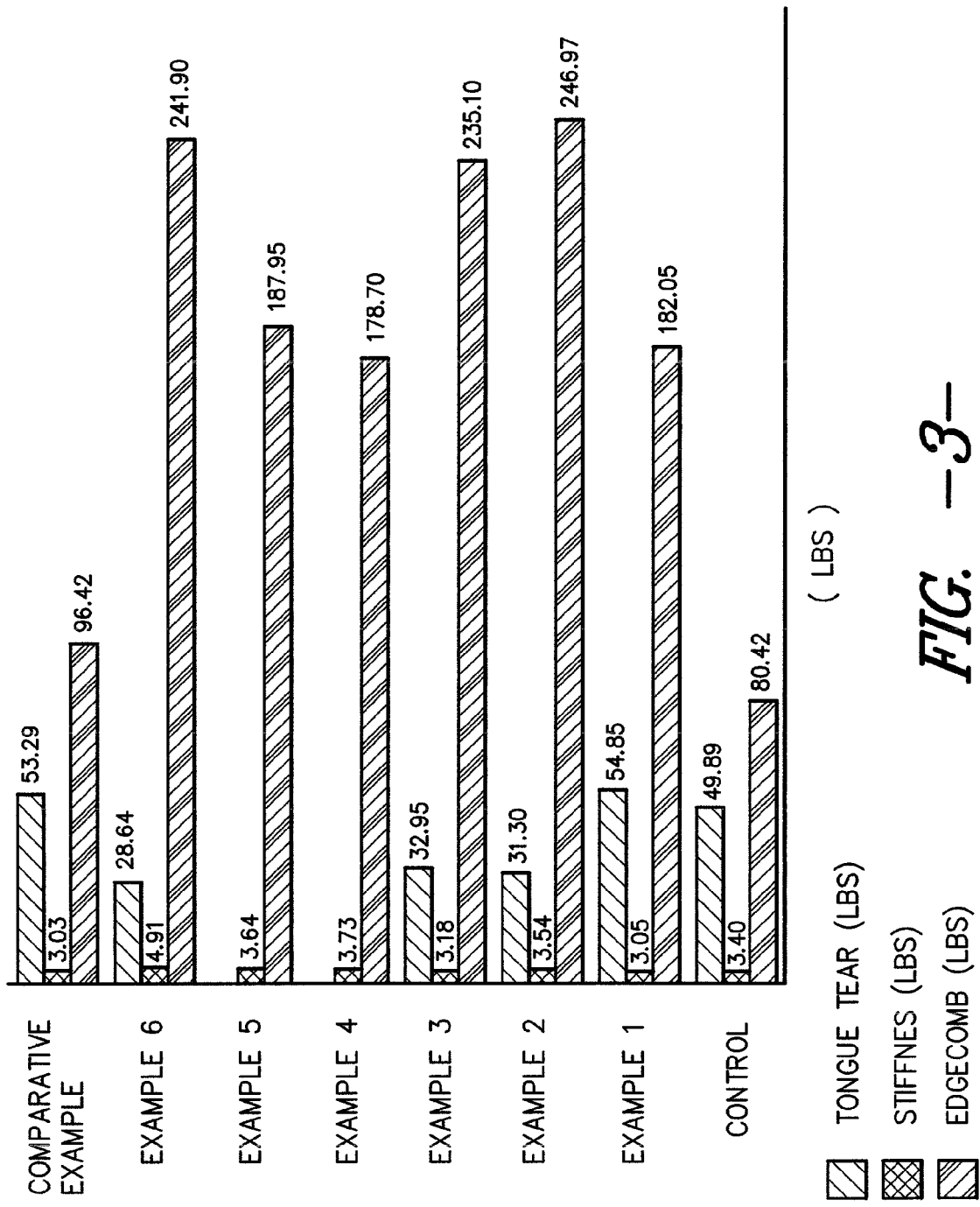
FIG. -3-

COATINGS FOR AIRBAG FABRICS, COATED AIRBAG FABRICS, AND METHODS FOR MAKING THE SAME

CROSS-REFERENCE TO RELATED PATENT APPLICATIONS

This application claims, under 35 U.S.C. §119(e), the benefit of the filing date of copending, provisional U.S. Patent Application No. 60/742,230, which was filed on Dec. 5, 2005.

FIELD OF THE INVENTION

The present application is directed to coatings for airbag fabrics, airbag fabrics incorporating such coatings, and methods for making such coated airbag fabrics.

BRIEF DESCRIPTION OF THE DRAWINGS

FIG. 1 is a scanning electron micrograph (2,020 times magnification) of the surface of the untreated airbag fabric described in the Examples.

FIG. 1A is a scanning electron micrograph (2,020 times magnification) of the surface of the untreated airbag fabric described in the Examples.

FIG. 2 is a scanning electron micrograph (2,000 times magnification) of the surface of the fabric produced in Example 6.

FIG. 2A is a scanning electron micrograph (2,000 times magnification) of the surface of the fabric produced in Example 6.

FIG. 3 is a graph showing the edgecomb resistance, tongue tear resistance, and stiffness of the fabrics produced in Examples 1-6 and the Comparative Example, as well as for the Control fabric.

BRIEF SUMMARY OF THE INVENTION

In one embodiment, the invention provides an airbag fabric having a finish on a surface thereof, the finish comprising a plurality of particles having a diameter of about 20 µm or less.

In a method embodiment, the invention provides a process for producing a coated airbag fabric, the process comprising the steps of (a) providing an airbag fabric, (b) contacting at least one surface of the airbag fabric with a coating composition comprising a plurality of particles having a diameter of about 20 µm or less, and (c) drying the fabric treated in step (b) to produce a finish on the airbag fabric.

DETAILED DESCRIPTION OF THE INVENTION

As noted above, the invention provides an airbag fabric having a finish on a surface thereof, the finish comprising a plurality of particles having a diameter of about 20 µm or less.

The airbag fabric can be any suitable fabric. For example, the airbag fabric can comprise synthetic fibers, preferably, polyesters or polyamides (e.g., nylon). The yarns of the airbag fabric can be provided in any suitable construction, such as a plain weave or a Jacquard weave. Furthermore, the airbag fabric can be comprised of a plurality of individual fabric pieces that have been sewn or stitched together to form the airbag fabric, or the airbag fabric can be a one-piece, woven airbag. Suitable one-piece, woven airbags include, but are not limited to, those airbags disclosed in U.S. Pat. Nos. 5,011,183 (Thornton et al.); 6,220,309 (Sollars, Jr.); 6,595,244 (Sollars, Jr.); and 7,069,961 (Sollars, Jr.), as well as copending U.S. patent application Ser. No. 11/473,707, which was filed on Jun. 23, 2006. Each of the aforementioned patents and patent applications is hereby specifically incorporated by reference for its teachings relating to one-piece, woven airbags to the same extent as if each reference's teachings were set forth in their entirety herein.

The finish on the airbag fabric comprises particulate matter (e.g., a plurality of particles). The particles included in the finish can be any suitable particles, but preferably are particles having a diameter of about 20 µm or less, or about 10 µm or less, or about 1 µm or less (e.g., about 500 nm or less or about 300 nm or less). Particles suitable for use in the finish include, but are not limited to, silica particles, (e.g., fumed silica particles, precipitated silica particles, alumina-modified colloidal silica particles, etc.), alumina particles (e.g. fumed alumina particles), and combinations thereof. In certain possibly preferred embodiments, the particles are comprised of at least one material selected from the group consisting of fumed silica, precipitated silica, fumed alumina, alumina modified silica, zirconia, titania, silicon carbide, titanium carbide, tungsten carbide, titanium nitride, silicon nitride, and combinations thereof. Such particles can also be surface modified, for instance by grafting, to change surface properties such as charge and hydrophobicity. Suitable commercially available particles include, but are not limited to, the following: CAB-O-SPERSE® PG003 fumed alumina, which is a 40% by weight solids aqueous dispersion of fumed alumina available commercially from Cabot Corporation of Boyertown, Pa. (the dispersion has a pH of 4.2 and a median average aggregate particle size of about 150 nm); SPECTRAL™ 51 fumed alumina, which is a fumed alumina powder available commercially from Cabot Corporation of Boyertown, Pa. (the powder has a BET surface area of 55 $m^2$/g and a median average aggregate particle size of about 150 nm); CAB-O-SPERSE® PG008 fumed alumina, which is a 40% by weight solids aqueous dispersion of fumed alumina available commercially from Cabot Corporation of Boyertown, Pa. (the dispersion has a pH of 4.2 and a median average aggregate particle size of about 130 nm); SPECTRAL™ 81 fumed alumina, which is a fumed alumina powder available commercially from Cabot Corporation of Boyertown, Pa. (the powder has a BET surface area of 80 $m^2$/g and a median average aggregate particle size of about 130 nm); AEROXIDE ALU C fumed alumina, which is a fumed alumina powder available commercially from Degussa, Germany (the powder has a BET surface area of 100 $m^2$/g and a median average primary particle size of about 13 nm); LUDOX CL-P colloidal alumina coated silica, which is a 40% by weight solids aqueous sol available from Grace Davison (the sol has a pH of 4 and an average particle size of 22 nm in diameter); NALCO 1056 aluminized silica, which is a 30% by weight solids aqueous colloidal suspension of aluminized silica particles (26% silica and 4% alumina) available commercially from Nalco; LUDOX TMA colloidal silica, which is a 34% by weight solids aqueous colloidal silica sol available from Grace Davison. (the sol has a pH of 4.7 and an average particle size of 22 nm in diameter); NALCO 88SN-126 colloidal titanium dioxide, which is a 10% by weight solids aqueous dispersion of titanium dioxide available commercially from Nalco; CAB-O-SPERSE® S3295 fumed silica, which is a 15% by weight solids aqueous dispersion of fumed silica available commercially from Cabot Corporation of Boyertown, Pa. (the dispersion has a pH of 9.5 and an average agglomerated primary particle size of about 100 nm in diameter); CAB-O-SPERSE® 2012A fumed silica, which is a 12% by weight solids aqueous dispersion of fumed silica available commercially from Cabot Corporation of Boyertown, Pa. (the dispersion has a pH of 5); CAB-O-SPERSE®

PG001 fumed silica, which is a 30% by weight solids aqueous dispersion of fumed silica available commercially from Cabot Corporation of Boyertown, Pa. (the dispersion has a pH of 10.2 and a median aggregate particle size of about 180 nm in diameter); CAB-O-SPERSE® PG002 fumed silica, which is a 20% by weight solids aqueous dispersion of fumed silica available commercially from Cabot Corporation of Boyertown, Pa. (the dispersion has a pH of 9.2 and a median aggregate particle size of about 150 nm in diameter); CAB-O-SPERSE® PG022 fumed silica, which is a 20% by weight solids aqueous dispersion of fumed silica available commercially from Cabot Corporation of Boyertown, Pa. (the dispersion has a pH of 3.8 and a median aggregate particle size of about 150 nm in diameter); SIPERNAT 22LS precipitated silica, which is a precipitated silica powder available from Degussa of Germany (the powder has a BET surface area of 175 $m^2/g$ and a median average primary particle size of about 3 µm); SIPERNAT 500LS precipitated silica, which is a precipitated silica powder available from Degussa of Germany (the powder has a BET surface area of 450 $m^2/g$ and a median average primary particle size of about 4.5 µm); and VP Zirconium Oxide fumed zirconia, which is a fumed zirconia powder available from Degussa of Germany (the powder has a BET surface area of 60 $m^2/g$).

In certain possibly preferred embodiments, the particles can have a positive surface charge when suspended in an aqueous medium, such as an aqueous medium having a pH of about 4 to 8. Particles suitable for use in this embodiment include, but are not limited to, alumina-modified colloidal silica particles, alumina particles (e.g. fumed alumina particles), and combinations thereof. In certain possibly preferred embodiments, the particles can have a Mohs' hardness of about 5 or more, or about 6 or more, or about 7 or more. Particles suitable for use in this embodiment include, but are not limited to, fumed alumina particles. In certain possibly preferred embodiments, the particles can have a three-dimensional branched or chain-like structure comprising or consisting of aggregates of primary particles. Particles suitable for use in this embodiment include, but are not limited to, fumed alumina particles, fumed silica particles, and combinations thereof.

The particles included in the finish can be modified to impart or increase the hydrophobicity of the particles. For example, in those embodiments comprising fumed silica particles, the fumed silica particles can be treated, for example, with an organosilane in order to render the fumed silica particles hydrophobic. Suitable commercially-available hydrophobic particles include, but are not limited to, the R-series of AEROSIL® fumed silicas available from Degussa, such as AEROSIL® R812, AEROSIL® R816, AEROSIL® R972, and AEROSIL® R7200. When hydrophobic particles are utilized in the finish on the fabric, the hydrophobic particles can be applied using a solvent-containing or a surfactant-containing coating composition in order to assist their application.

The finish can comprise any suitable amount of the particles. Typically, the amount of particles present in the finish will be about 0.05 wt. % or more, based on the weight of the untreated airbag fabric. In certain possibly preferred embodiments, the amount of particles present in the finish will be about 0.07 wt. % or more (e.g., about 0.1 wt. % or more), based on the weight of the untreated airbag fabric. Typically, the amount of particles present in the finish will be comprise about 1.5 wt. % or less (e.g., about 1 wt. % or less or about 0.5 wt. % or less), based on the weight of the untreated airbag fabric.

In certain possibly preferred embodiments of the fabric, the finish applied to the airbag fabric can further comprise a binder. The binder included in the finish can be any suitable binder. Suitable binders include, but are not limited to, isocyanate binders (e.g., blocked isocyanate binders), acrylic binders (e.g., nonionic acrylic binders), polyurethane binders (e.g., aliphatic polyurethane binders and polyether based polyurethane binders), fluoropolymer binders, and combinations thereof. In certain possibly preferred embodiments, the binder is a cross-linking binder, such as a blocked isocyanate binder.

When present, the binder can comprise any suitable amount of the finish applied to the airbag fabric. The ratio of the amount (e.g., weight) of particles present in the finish to the amount (e.g., weight) of binder solids present in the finish typically is greater than about 1:1 (weight particles:weight binder solids). In certain possibly preferred embodiments, the ratio of the amount (e.g., weight) of particles present in the finish to the amount (e.g., weight) of binder solids present in the finish is greater than about 2:1, or greater than about 3:1, or greater than about 4:1, or greater than about 5:1 (e.g., greater than about 6:1, greater than about 7:1, or greater than about 8:1).

The airbag fabric of the invention preferably does not exhibit any substantial change in flexibility or stiffness as compared to similar, uncoated fabrics. In particular, the airbag fabric preferably exhibits the same or substantially similar flexibility or stiffness as compared to similar, uncoated airbag fabrics. The flexibility or stiffness of the airbag fabric can be tested, for example, in accordance with ASTM Standard D4032-94.

The airbag fabric of the invention can be produced by any suitable method or process; however, the invention also provides a process for producing the composite. In particular, the process comprises the steps of (a) providing an airbag fabric, (b) contacting at least one surface of the airbag fabric with a coating composition comprising a plurality of particles having a diameter of about 20 µm or less, and (c) drying the fabric treated in step (b) to produce a finish on the airbag fabric.

The airbag fabrics suitable for use in the above-described method include, but are not limited to, those materials described above as being suitable for use in the airbag fabric of the invention. Also, the coating compositions suitable for used in the method include, but are not limited to, those compositions containing the particles and, optionally, binders described above as being suitable for use in the airbag fabric of the invention. Typically, a coating composition suitable for use in the above-described method comprises an aqueous dispersion of the particles and, optionally, a binder.

The surface(s) of the airbag fabric (or any portion thereof) can be contacted with the coating composition in any suitable manner. The airbag fabric can be contacted with the coating composition using conventional padding, spraying (wet or dry), foaming, printing, coating, and exhaustion techniques. For example, the airbag fabric can be contacted with the coating composition using a padding technique in which the fabric is immersed in the coating composition and then passed through a pair of nip rollers to remove any excess liquid. In such an embodiment, the nip rollers can be set at any suitable pressure, for example, at a pressure of about 280 kPa (40 psi). Any suitable portion of the surface of the airbag fabric can be contacted with the coating composition. For example, the airbag fabric can be treated at those portions of the airbag fabric which will correspond to the seams of the final airbag.

The coated airbag fabric can be dried using any suitable technique at any suitable temperature. For example, the airbag fabric can be dried on a conventional tenter frame or range at a temperature of about 160° C. (320° F.) for approximately five minutes.

Airbag fabrics according to the invention can be used in any suitable airbag module. For example, airbag fabric according to the invention can be utilized in driver side and/or passenger side front airbags, side airbags (e.g., side curtain airbags), and the like. Airbag fabrics according to the invention can also comprise one or more of the coatings and/or finishes typically found on conventional airbags. Such coatings and/or finishes include, but are not limited to, those coatings and/or finishes that reduce the porosity of the airbag fabric, such as a silicone coating, which enables an airbag constructed from the airbag fabric to remain inflated for a longer period of time than an airbag constructed from the uncoated fabric. Commercially-available silicones suitable for use in producing such coatings include, but are not limited to, the silicone sold under the product designation "X-32-2337" by Shin-Etsu Chemical Co., Ltd. of Japan and the silicone sold under the product designation "6291" by Wacker Chemie. Such coatings and/or finishes can be present on the airbag fabric in any suitable amount. Typically, the coating and/or finish is present on the airbag fabric in an amount of about 110 $g/m^2$ or less. In certain possibly preferred embodiments, the coating and/or finish is present on the airbag fabric in an amount of about 95 $g/m^2$ or less, about 75 $g/m^2$ or less, about 55 $g/m^2$ or less, about 35 $g/m^2$ or less, or about 25 $g/m^2$ or less.

While the foregoing description has concentrated on embodiments relating to airbag fabrics and coatings therefor, the finish described above can be applied to other textile materials. For example, the finish can be applied to other natural or synthetic fiber-containing fabrics. Thus, in other embodiments, the invention provides fabrics having a finish on a surface thereof, the finish comprising a plurality of particles having a diameter of about 20 μm or less. The particles in the finish of such an embodiment can be any of the particles described above. The finish applied to the fabric in such an embodiment can also comprise any of the additional additives described above, such as, a binder.

The following examples further illustrate the invention but, of course, should not be construed as in any way limiting its scope.

Examples

Seven samples (Examples 1-6 and Comparative Example) were produced by coating a plain woven airbag fabric using a "padding" process. The airbag fabric comprised 630 denier nylon yarns in the warp and fill, with 41 ends per inch (16 ends per cm) and 41 picks per inch (16 picks per cm). As noted above, the samples were treated using a "padding" process, wherein a liquid coating is applied to a textile substrate by passing the substrate through a bath and subsequently through squeeze rollers. In particular, a piece of fabric was immersed in a bath containing the chemical composition containing the desired chemical agents. Unless otherwise stated, all chemical percents (%) were percent by weight based on the total weight of the bath prepared, and the balance remaining, when chemical percents or grams of chemical are given, is comprised of water. In addition, the percent chemical was based on the chemical as received from the manufacturer, such that if the composition contained 30% active component, then X % of this 30% composition was used.

After the fabric was completely wet by immersion in the bath, the fabric was removed from the treatment bath and run between squeeze rolls at a pressure of approximately 40 psi (280 kPa) to obtain a uniform pickup of approximately 35% based on the pre-treatment weight of the fabric. The fabric was then pulled taut and pinned to a frame to retain the desired dimensions. The pin frame was placed into a Despatch oven at a temperature of approximately 300 to 320° F. (approximately 150 to 160° C.) for approximately 5 to 8 minutes to dry and to cure the finish. Once removed from the oven, the fabric was removed from the pin frame and allowed to equilibrate at room temperature for at least 24 hours prior to testing.

Example 1 was prepared by coating the fabric in a bath comprising approximately 5 grams (or 0.5%) of CAB-O-SPERSE® PG003 (a fumed alumina dispersion (40% solids) with 150 nm particle size available from Cabot Corporation) and approximately 995 grams of water. Example 2 was prepared by coating the fabric in a bath comprising approximately 5 grams (or 0.5%) of CAB-O-SPERSE® PG003, 0.5 grams (or 0.05%) MILLITEX™ Resin MRX (a blocked isocyanate based cross-linking agent (with 35-45% solids) available from Milliken Chemical), and 994.5 grams of water. Example 3 was prepared by coating the fabric in a bath comprising approximately 5 grams (or 0.5%) of CAB-O-SPERSE® PG008 (a fumed alumina dispersion (40% solids) with 130 nm particle size available from Cabot Corporation), 0.5 grams (or 0.05%) of MILLITEX™ Resin MRX, and 994.5 grams of water. Example 4 was prepared by coating the fabric in a bath comprising approximately 5 grams (or 0.5%) of LUDOX CL-P (a colloidal alumina-coated silica sol (40% solids) with 22 nm particle size available from Grace Davison), 0.5 grams (or 0.05%) of MILLITEX™ Resin MRX, and 994.5 grams of water. Example 5 was prepared by coating the fabric in a bath comprising approximately 16.7 grams (or 1.67%) of CAB-O-SPERSE® 2012A (a fumed silica dispersion (12% solids) available from Cabot Corporation), 0.5 grams (or 0.05%) of MILLITEX™ Resin MRX, and 982.8 grams of water. Example 6 was prepared by coating the fabric in a bath comprising approximately 25 grams (or 2.5%) of CAB-O-SPERSE® PG008, 2.5 grams (or 0.25%) of MILLITEX™ Resin MRX, and 972.5 grams of water. Comparative Example was prepared by coating the fabric in a bath comprising approximately 0.5 grams (or 0.05%) of MILLITEX™ Resin MRX and 999.5 grams of water.

Following treatment, each of the samples was tested to determine its edgecomb resistance and stiffness. Examples 1-3, Example 6, Comparative Example, and the untreated airbag fabric ("Control") were also tested to determine the tongue tear resistance of the airbag fabric. The edgecomb resistance testing was performed according to the ASTM Standard D6479-02. In this test, one end of a test specimen (typically 50 mm wide and 300 mm long) is clamped within one jaw of a constant-rate-of-extension (CRE) tensile testing machine and a special fixture pierces a row of equally spaced needle holes through the opposite end of the specimen. A tensile force is applied to the specimen until rupture occurs. The force required to cause rupture is referred to as the edgecomb resistance of the fabric.

The tongue tear resistance testing was performed according to the ASTM Standard D2261-96. In this test, a rectangular test specimen (typically 75 mm wide and 200 mm long) is cut in the center of a short edge to form a two-tongued specimen. One tongue of the specimen is gripped in the upper jaw and the other tongue is gripped in the lower jaw of a CRE tensile testing machine. The separation of the jaws is continuously increased to apply a force to propagate the tear. The force developed is recorded at the same time.

The stiffness testing was performed using a circular bend procedure according to the ASTM Standard D4032-94. In this test, a plunger forces a flat, folded swatch of fabric through an orifice in a platform. The maximum force required to push the fabric through the orifice is the stiffness of the fabric (resistance to bending).

The results of the above-described tests, as well as those obtained for the untreated airbag fabric (Control), are set forth in FIG. 3. As can be seen from FIG. 3, the samples treated in accordance with the present invention (Examples 1-5) each exhibited an increase in the edgecomb resistance of at least approximately 85% as compared to the Comparative Example and an increase of at least approximately 120% as compared to the untreated airbag fabric (Control). Furthermore, the results also demonstrate that the treatment does not significantly increase (and in some instances it decreases) the stiffness of the treated fabric as compared to the untreated airbag fabric (Control).

Scanning electron micrographs of the surfaces of the fabric produced in Example 6 and the untreated airbag fabric (Control) were also obtained. The micrographs of the untreated airbag fabric (Control) are depicted in FIG. 1 and FIG. 1A. The micrographs of the surface of the fabric produced in Example 6 are depicted in FIG. 2 and FIG. 2A. As can be seen from a comparison of the micrographs, the particles have formed a finish on the surface of the treated airbag fabric (i.e., the fabric produced in Example 6).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An airbag fabric having a finish on at least a portion of a surface thereof, the finish comprising a binder and a plurality of particles, wherein the plurality of particles are in an amount of about 0.05 to about 1.5 wt. % based on the weight of the airbag fabric, wherein the plurality of particles have a diameter of about 20 μm or less, and wherein the ratio of particles to binder present in the finish is about 1:1 or more, based on the weight of the particles and the weight of binder solids.

2. The airbag fabric of claim 1, wherein the particles are selected from the group consisting of silica, alumina, silicon carbide, titanium carbide, tungsten carbide, titanium nitride, silicon nitride, and combinations thereof.

3. The airbag fabric of claim 2, wherein the particles are selected from the group consisting of fumed alumina, fumed silica, alumina-modified colloidal silica, and combinations thereof.

4. The airbag fabric of claim 3, wherein the particles comprise fumed alumina.

5. The airbag fabric of claim 1, wherein the particles have a diameter of about 300 nm or less.

6. The airbag fabric of claim 1, wherein the finish further comprises a binder.

7. The airbag fabric of claim 1, wherein the airbag fabric exhibits a porosity, wherein the airbag fabric further comprises a second coating on at least a portion of the surface thereof, and the second coating reduces the porosity of the airbag fabric relative to an uncoated airbag fabric.

8. The airbag fabric of claim 7, wherein the second coating comprises a silicone compound.

9. The airbag fabric of claim 7, wherein the second coating is present on the airbag fabric in an amount of about 110 g/m² or less.

10. The airbag fabric of claim 1, wherein the airbag fabric is a one-piece, woven airbag.

11. The airbag fabric of claim 10, wherein the airbag fabric comprises at least one seam at a juncture between first and second fabric layers of the airbag fabric, and the finish is applied to the at least one seam.

12. A process for producing a coated airbag fabric, the process comprising the steps of:
    (a) providing an airbag fabric,
    (b) contacting at least a portion of one surface of the airbag fabric with a finish comprising a binder and a plurality of particles, wherein the plurality of particles are in an amount of about 0.05 to about 1.5 wt. % based on the weight of the airbag fabric, wherein the plurality of particles have a diameter of about 20 μm or less, and wherein the ratio of particles to binder present in the finish is about 1:1 or more, based on the weight of the particles and the weight of binder solids, and
    (c) drying the fabric treated in step (b) to produce a finish on the airbag fabric.

13. The process of claim 12, wherein the finish comprises about 0.05 to about 1.5 wt. %, based on the weight of the airbag fabric, of the particles.

14. The process of claim 12, wherein the particles are selected from the group consisting of fumed alumina, fumed silica, alumina-modified colloidal silica, and combinations thereof.

15. The process of claim 12, wherein the airbag fabric provided in step (a) is a one-piece, woven airbag.

16. The process of claim 12, wherein the airbag fabric produced in step (c) exhibits a porosity and the process further comprises the step of:
    (d) applying a second coating composition to at least a portion of one surface of the airbag fabric, the second coating composition producing a finish on at least a portion of the surface of the airbag fabric, and the finish reduces the porosity of the airbag fabric relative to the airbag fabric produced in step (c).

17. The process of claim 16, wherein the airbag fabric provided in step (a) is a one-piece, woven airbag.

* * * * *